H. G. WEBSTER.
TELEPHONE EXCHANGE SYSTEM.
APPLICATION FILED JUNE 3, 1903.
Reissued Mar. 31, 1914.
13,710.
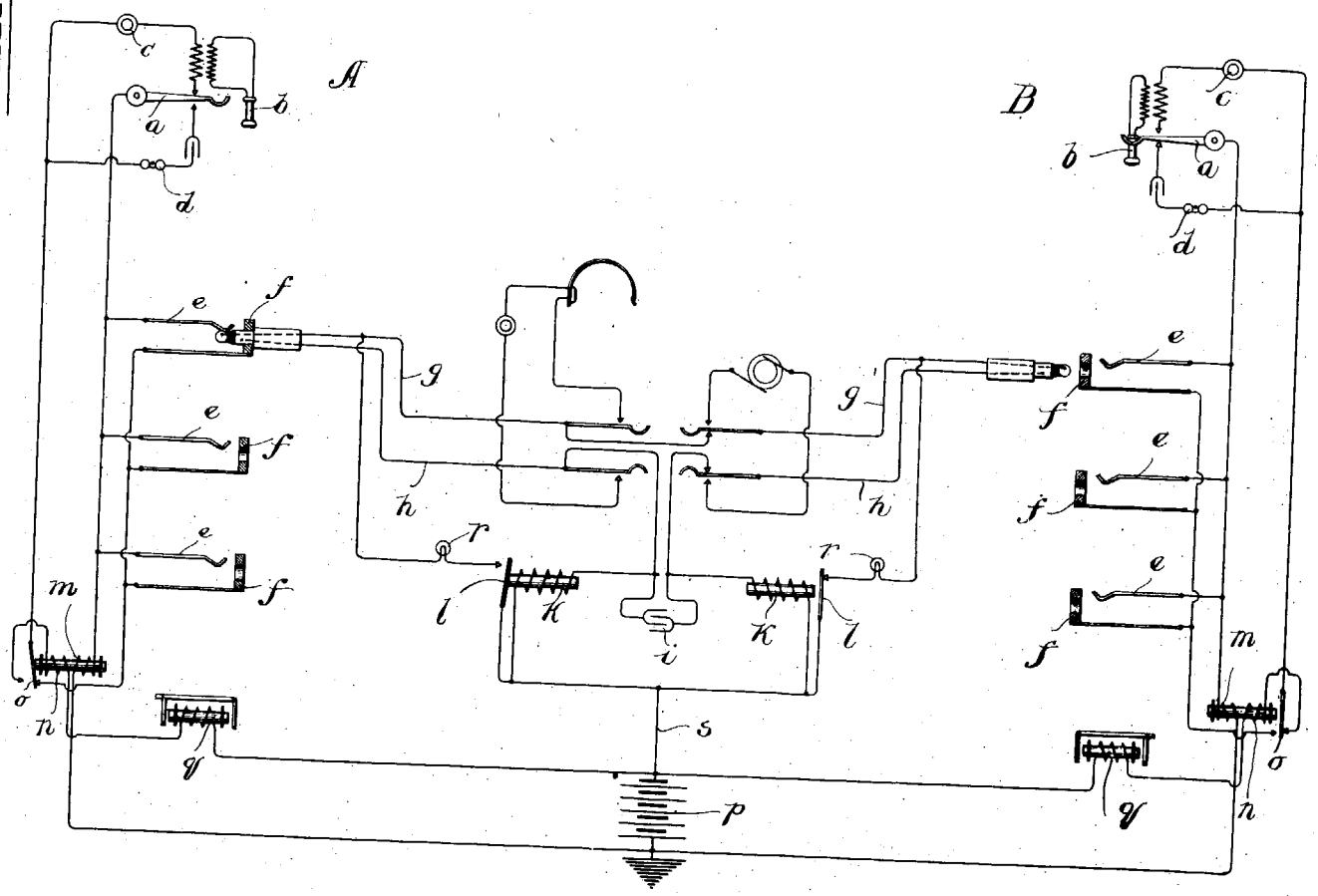
Witnesses:
Leonard W. Novander.
Lynn A. Williams.
Inventor
HARRY G. WEBSTER
By Charles A. Moore
Attorney.

UNITED STATES PATENT OFFICE.

HARRY G. WEBSTER, OF CHICAGO, ILLINOIS, ASSIGNOR, BY MESNE ASSIGNMENTS, TO STROMBERG-CARLSON TELEPHONE MANUFACTURING COMPANY, OF ROCHESTER, NEW YORK, A CORPORATION OF NEW YORK.

TELEPHONE-EXCHANGE SYSTEM.

13,710. Specification of Reissued Letters Patent. Reissued Mar. 31, 1914.

Original No. 688,452, dated December 10, 1901, Serial No. 41,642. Application for reissue filed June 3, 1903. Serial No. 159,915.

*To all whom it may concern:*

Be it known that I, HARRY G. WEBSTER, a citizen of the United States, residing at Chicago, in the county of Cook and State of Illinois, have invented a certain new and useful Improvement in Telephone-Exchange Systems, of which the following is a full, clear, concise, and exact description, reference being had to the accompanying drawing, forming a part of this specification.

My invention relates to telephone exchange systems, and has for its object the provision of improved line signaling mechanism at the exchange, whereby the employment of the present complicated cut-off relays and associated switching mechanism may be dispensed with.

Broadly stated, my invention consists in the provision at a central exchange of a line indicator and a cut-off relay, both of which are normally connected in the telephone line circuit. The line indicator is so constructed and so connected as to be sensitive to currents through the telephone line controlled by apparatus located at the associated substation. The cut-off relay, however, is not sensitive to currents controlled from the subscriber's substation, control of the cut-off relay being effected by switching devices under the control of the central station operator. The cut-off relay when actuated due to the control exercised by the central station operator destroys the substation control of the line indicator.

In accordance with my invention, I may employ for the line indicating mechanism a differentially wound relay, the oppositely wound coils of which, when included in circuit with the battery or other source of current, serve to exert a neutralizing effect upon each other, so that the armature of the differentially wound relay will not be actuated. The armature of this relay normally rests against a back contact that is connected with one terminal of a line indicator. The indicator and relay are so associated with the telephone line that a subscriber in initiating a call will effect the passage of current through the coils of the relay and the said indicator or the electromagnet of the indicator to effect operation of the same. The arrangement is such that current flowing through the coils of the relay will not serve to remove its armature from the said normal back contact, whereby the signal may be effected and maintained until the operator modifies the circuit conditions by means of her switching apparatus. The operator's cord connecting apparatus for connecting telephone lines for conversation, which may be used in systems employing my invention, is adapted upon connection with a line circuit to cause the establishment of a path of decreased resistance through one of the coils of the cut-off relay, whereby the increased current flowing through this coil causes a net energization of the relay to attract its armature. The armature, when thus attracted, is removed from the back contact connected with the line indicator, whereby said indicator and the idle relay coil are cut out of circuit, the armature being thereupon brought into contact with an alternate contact anvil, whereby the circuit through the active relay coil is maintained during the closure of a conductively continuous circuit through the substation apparatus associated with the line.

In effecting the control of the cut-off relay and indicator by means of the line connecting apparatus, I preferably employ an electromagnet in the cord circuit, and I provide a switch controlled by said electromagnet, which, in its normal position, will afford a local circuit for that coil of the relay that is to remain inactive, said electromagnet being adapted for inclusion directly in the line circuit when the relay armature is attracted from its normal to its alternate position, whereupon the electromagnet serves to operate its associated switch to open the local circuit, the active coil of the relay and the said electromagnet being thereupon included preferably in a bridge of the circuit. A common battery is employed and is preferably located between the active coil of the line relay and the said electromagnet, the said active coil and the electromagnet thereby affording the necessary impedance to prevent the shunting of voice currents.

I will explain my invention more fully by reference to the accompanying drawing, which illustrates a multiple switchboard system constructed in accordance with my invention. The invention, however, may be employed in connection with other systems.

In the drawing I have illustrated two telephone stations, A and B, each provided with a telephone switch hook *a*, a telephone receiver *b*, a transmitter *c* and a signal receiver *d*. The system illustrated is a common battery system, and therefore the substations are in this instance not provided with magneto generators, but I do not wish to be limited to such a system. Each telephone line extends by its limbs to the exchange and is there connected with the tip line springs *e* of the line jacks. Two plugs are preferably employed, having tips and sleeves connected by a tip strand *g* and a sleeve strand *h*. The sleeve strand *h* includes a condenser *i*. Electromagnets *k*, *k* are included in a conductor that is in shunt of the condenser, while switches *l*, *l* are included in branches that connect the tip strand with the sleeve strand.

The line signaling mechanism constructed in accordance with my invention comprises in its preferred embodiment a relay having oppositely or differentially wound coils, *m*, *n*, which create equal opposing effects. The armature *o* of the relay normally includes the coils of the relay in series with the common battery *p*, which may be of forty volts pressure, and the line indicator or the electromagnet of the line indicator *q*, the said instrumentalities being preferably connected normally in series with the corresponding telephone line, so that when a subscriber removes his telephone from its switch hook a circuit is completed through the said instrumentalities, whereby a calling signal is manifested, which calling signal is maintained as long as the coils *m* and *n* exert their opposing effects, the armature *o* then remaining in its normal position. When the operator inserts a plug in response to a signal or in connecting a called subscriber, current from the battery *p* is principally confined to a path that includes the helix *m*, the tip line spring, the tip of the inserted plug, the separable contacts of the switch *l*, the clearing-out indicator *r* and the conductor *s* that is connected with the remaining terminal of the battery. The current is confined principally to this path, as the winding of the line indicator magnet is preferably of comparatively high resistance, as, for example, 500 ohms, while each winding of the cut-off relay is of 200 ohms resistance. Each clearing-out indicator *r* may be in the form of a twenty volt lamp, so that the circuit through the coil *m* is of much less resistance than the circuit through the coil *n*. The neutralizing effect of the coils of the relay is thus overcome and the armature *o* is attracted toward its alternate contact. When the armature is thus attracted the circuit through the line indicator is opened and the magnet *k*, that may be wound to 200 ohms resistance, is included in a circuit with the line, the circuit being traced from magnet *k* through the conductor *s*, the battery *p*, coil *m*, one limb of the telephone line that is connected with the tip line spring, and back through the sleeve or socket of the springjack to the said electromagnet, which is thereupon energized to cut out the clearing-out indicator. The circuit through the relay winding *m* is then maintained through the line circuit to the subscriber's substation, rather than through the clearing-out indicator *r*, whereby the armature *o* is maintained in its alternate attracted position. When the subscriber is through conversation he opens the circuit through the magnet *k* by replacing his receiver upon the switch hook, whereby the said electromagnet is deënergized and the passage of current through the corresponding indicator *r* reëffected to convey the proper signal.

It will be observed that I have provided a telephone system in which the sleeve contacts of sockets *f* of the line and answering jacks, which sockets also form the test terminals of these packs, are normally disconnected and insulated from all parts of the telephone line circuit. An actuation of the differential cut-off relay serves to connect these test terminals directly with a limb of the associated telephone line. The multiple jack wiring is used first as a local circuit for testing purposes and then as a line circuit for purposes of communication between connected subscribers.

I have not seen fit to describe the operator's listening outfit, telephone outfit and the signaling generator employed by the exchange, as these instrumentalities are well known in the art.

While I have herein shown and particularly described the preferred embodiment of my invention, I do not wish to be limited to the precise disclosure herein set forth, but

Having thus described my invention, what I claim as new and desire to secure by Letters Patent is:—

1. In a telephone exchange system, the combination with a telephone line extending from a subscriber's station to an exchange, of a line relay at the exchange provided with differentially-wound coils, a line indicator, means controlled by the said relay for governing the operation of the said indicator, means controlled by the subscriber for directing current through the said relay and line indicator to effect the operation of the latter, and switching apparatus controlled by the operator for increasing the magnetizing effect of one of the coils of the relay above that produced by the other, to effect the operation of the said relay-controlled means and thereby cut out or render ineffective the line indicator, substantially as described.

2. In a telephone exchange system, the combination with a telephone line extending from a subscriber's station to an exchange, of a relay provided with differentially-wound coils, a source of current, means controlled by the subscriber for including the said coils in circuit with the said source of current, a line indicator adapted to be operated by the said current when thus included in circuit, means controlled by the said relay for cutting out the said indicator, and means controlled by the operator whereby the magnetizing effect due to one of the coils of the relay may be increased above that due to the other, to effect the operation of the relay-controlled means and thereby render ineffective the line indicator, substantially as described.

3. In a telephone exchange system, the combination with a telephone line extending from a subscriber's station to an exchange, of a relay at the exchange provided with differentially-wound coils, a line indicator, a switch adapted for operation by the said relay, a source of current adapted for inclusion in circuit with the same switch, the line indicator and the coils of the relay, means at the subscriber's station for closing circuit through the said switch, line indicator, battery and relay coils, means controlled by the operator for producing a greater magnetizing effect in one of said coils above the other, whereby the said switch, when operated, will cut out or render ineffective the line indicator and one of the relay coils, and maintain the remaining relay coil in a closed circuit, substantially as described.

4. In a telephone exchange system, the combination with a telephone line extending from a subscriber's station to an exchange, of a differentially-wound relay, operator's means for connecting the said telephone line with a second telephone line, circuit connections whereby the operator's connecting means may effect a greater magnetizing effect in one of the relay coils with reference to the other, and a switch controlled by the relay and operated thereby when the magnetizing effects of its coils are thus unbalanced, and serving, when operated, to cut out or render ineffective the remaining coil of the relay and the line indicator, substantially as described.

5. In a telephone-exchange system, the combination with a telephone-line extending from a subscriber's station to an exchange, of a line-relay at the exchange provided with differentially wound coils, a source of current, means controlled by the subscriber for including the said relay in circuit of said source of current, whereby the relay remains inoperative, a line-indicator also adapted for inclusion in circuit of the source of current by the said subscriber's means, a local circuit at the exchange, an operator's switching apparatus for connecting subscribers for conversation, means coacting with said switching apparatus serving to close the said local circuit through one of the windings of the relay when the said switching apparatus is manipulated to connect the subscribers for conversation, the said local circuit being of lower resistance than the circuit closed by the subscriber through the line relay and indicator, whereby the magnetization due to the said coil included in the local circuit, is increased above that due to its companion coil, and a switch that is adapted thereupon to be actuated by the relay to cut out or render ineffective the line-indicator, substantially as described.

6. In a telephone-exchange system, the combination with a telephone-line extending from a subscriber's station to an exchange, of a line-relay at the exchange provided with differentially-wound coils, a source of current, means controlled by the subscriber for including the said relay in circuit of said source of current, whereby the relay remains inoperative, a line-indicator also adapted for inclusion in circuit of the source of current by the said subscriber's means, a local circuit at the exchange, an operator's switching apparatus for connecting subscribers for conversation, means coacting with said switching apparatus serving to close the said local circuit through one of the windings of the relay when the said switching apparatus is manipulated to connect the subscribers for conversation, the said local circuit being of lower resistance than the circuit closed by the subscriber through the line relay and indicator, whereby the magnetization due to the said coil included in the local circuit, is increased above that due to its companion coil, a switch that is adapted thereupon to be actuated by the relay to cut out or render ineffective the line-indicator, a switch included in the local circuit, an electromagnet for actuating the said switch to open the local circuit, and means whereby the switch controlled by the relay may, when actuated, close circuit through the said electromagnet, substantially as described.

7. In a telephone-exchange system, the combination with a telephone-line extending from a subscriber's station to an exchange, of a line-relay at the exchange provided with differentially-wound coils, a source of current, means controlled by the subscriber for including the said relay in circuit of said source of current, whereby the relay remains inoperative, a line-indicator also adapted for inclusion in circuit of the source of current by the said subscriber's means, a local circuit at the exchange, an operator's switching apparatus for connecting subscribers for conversation, means coacting with said switching apparatus serving to close the said local circuit through one of the windings of the relay when the said switching apparatus is manipulated to connect the subscribers for conversation, the said local circuit being of lower resistance than the circuit closed by the subscriber through the line relay and indicator, whereby the magnetization due to the said coil included in the local circuit, is increased above that due to its companion coil, a switch that is adapted thereupon to be actuated by the relay to cut out or render ineffective the line-indicator, a switch included in the local circuit, an electromagnet for actuating the said switch to open the local circuit, means whereby the switch controlled by the relay may, when actuated, close circuit through the said electromagnet, a clearing-out indicator included in the local circuit, and means whereby, when a subscriber is through conversation, circuit through the said electromagnet will be opened and the local circuit restored to effect a clearing-out signal, substantially as described.

8. In a telephone-exchange system, the combination with a telephone-line extending from a subscriber's station to an exchange, of a relay at the exchange provided with differentially-wound coils, an indicator, means controlled by the said relay for governing the operation of the said indicator, means controlled by the subscriber for directing current through the said relay and indicator to control the operation of the latter, and switching apparatus for increasing the magnetizing effect of one of the coils of the relay above that produced by the other, to effect the operation of the said relay-controlled means and thereby a change in the operative condition of the said indicator, substantially as described.

9. In a telephone-exchange system, the combination with a telephone-line extending from a subscriber's station to an exchange, of a bridge-conductor at the exchange across the telephone-line, a differentially-wound relay, a battery and a line indicator included in the said bridge, a switch adapted for operation by the said relay to cut out or render ineffective one of the coils of the relay and the line indicator, and means controlled by the operator for producing a preponderating magnetizing effect in the remaining coil of the relay to effect the actuation of the said switch, substantially as described.

10. In a multiple switchboard telephone exchange system, the combination with subscribers' telephone lines extending from subscribers' stations to the exchange and each there permanently connected with a contact of the several line jacks upon the different sections of the multiple board, a battery at the exchange for supplying talking current to the substation, one limb of each line extending to test contact portions of the jacks, a switch at the exchange being included in this limb of the line for opening and closing the same, an electromagnet for operating the switch, cord connecting apparatus serving to energize the magnet to operate the switch, the switch being adapted for automatic restoration when relieved of the influence of the electromagnet to restore the test condition, and testing means, substantially as described.

11. In a multiple switchboard telephone exchange system, the combination with subscribers' telephone lines extending from subscribers' stations to the exchange and each there normally connected with a contact of the several line jacks upon the different sections of the multiple board, a battery at the exchange for supplying talking current to the substation, one limb of each line extending to test contact portions of the jacks, a switch at the exchange being included in this limb of the line for opening and closing the same, an electromagnet for operating the switch, cord-connecting apparatus serving to energize the magnet to operate the switch, the switch being adapted for automatic restoration when relieved of the influence of the electromagnet to restore the test condition, and a local test circuit including a talking cord strand and the portion of the limb of the telephone line extending to the test contact portions of jacks, substantially as described.

12. In a telephone exchange system, the combination with a telephone line extending from a subscriber's station to an exchange, of a relay at the exchange provided with differentially-wound coils, an indicator, means controlled by the said relay for governing the operation of the said indicator, means controlled by the subscriber for directing current through the said relay to control the operation of the indicator, and switching apparatus for increasing the magnetizing effect of one of the coils of the relay above that produced by the other, to effect the operation of the said relay controlled means and thereby a change in the operative condition of the said indicator, substantially as described.

13. In a telephone exchange system, the combination with a telephone line extending from a subscriber's station to an exchange, of a relay at the exchange provided with differentially-wound coils, an indicator, means controlled by the said relay for governing the operation of the said indicator, means controlled by the subscriber for directing current through the said relay to control the operation of the indicator, and operator's switching apparatus at the exchange for increasing the magnetizing effect of one of the coils of the relay above that produced by the other to effect the operation of the said relay-controlled means and thereby a change in the operative condition of the said indicator, substantially as described.

14. In a telephone exchange system, the combination with a telephone line extending from a subscriber's station to an exchange, of a relay at the exchange provided with differentially-wound coils, an indicator, means controlled by the said relay for governing the operation of the said indicator, means controlled by the subscriber for directing current through the differentially-wound coils of the relay, and switching apparatus for directing current through the relay at the exchange to change the operative condition of the indicator, substantially as described.

15. In a telephone exchange system, the combination with a metallic telephone line and a testing and talking line terminal normally disconnected therefrom, of a relay for connecting said terminal with the line, a second line terminal normally connected with said line, a cord circuit terminating in a connecting plug, a source of talking current adapted to send current over the metallic circuit and means for closing the circuit of said source through said relay when connection is made with the line, said relay circuit including a talking strand of the cord circuit, a main terminal of the connecting plug, a line contact and a portion of a talking limb of the telephone line, substantially as described.

16. In combination, a telephone line, a source of current adapted to supply talking and signaling current to said line, a cut-off relay having its windings so connected in the line circuit as to be insensitive to current controlled by a switch in the line circuit, and a line indicator normally serially included in such line circuit.

17. In a telephone exchange system, the combination with a telephone line extending by its limbs from a substation to an exchange, of a source of current at the exchange adapted to supply talking and signaling current to said line, a cut-off relay having a winding permanently included in one of said line limbs, and a line indicator included in one of said line limbs, substantially as described.

18. In a telephone exchange system, the combination with a telephone line extending by its limbs from a substation to an exchange, of a source of current at the exchange adapted to supply talking current to said line, a cut-off relay having a winding permanently included in the line circuit, and a line indicator in the line circuit, substantially as described.

19. In a telephone exchange system, the combination with a telephone line extending by its limbs from a substation to an exchange, of a source of current at the exchange adapted to supply talking and signaling current to said line, a cut-off relay having a winding permanently serially included in the telephone line, a line indicator normally serially included in the telephone line, and a switch serving to disconnect the line indicator from the line circuit upon the actuation of the cut-off relay.

20. In combination, a common battery telephone line extending to a central office, a cord circuit at the central office for connecting said line with another for conversation, a cut-off relay so connected in the line circuit as to be insensitive to current controlled by the substation switch, a line signal normally included in the line circuit, and means whereby the connection of the cord circuit with the line causes an actuation of said cut-off relay to destroy the substation control of said line signal.

21. In a telephone exchange system, the combination with a telephone line extending by its limbs from a substation to an exchange, of a source of current at the exchange adapted to supply talking and signaling current to said line, cord-connecting apparatus for connecting said line with another for conversation, a cut-off relay having a winding permanently included in the line circuit, a line indicator in the line circuit, said line indicator being responsive to a control exercised from the substation, and means whereby the connection of said cord-connecting apparatus with said line causes the closure of a circuit of decreased resistance through said cut-off relay, whereby the same is actuated to destroy the substation control of said line indicator, substantially as described.

22. In combination, a source of current and a line indicator in circuit with a telephone line, and a cut-off relay having its windings so connected in said circuit as to be insensitive to current controlled by a switch in the telephone line.

23. In combination, a telephone line extending from a substation to an exchange, a source of current included in the line at the exchange, a line indicator also included in the line circuit, and a cut-off relay having its windings so connected in the line circuit as to be insensitive to current controlled by the substation switch but sensitive to current controlled by an operator's cord-connecting apparatus.

24. In a telephone exchange system, the combination with a telephone line extending by its limbs from a substation to an exchange, of a source of current located at the exchange for supplying talking and a signaling current to said line, cord-connecting apparatus for connecting said line with another for conversation, line jacks having test terminals normally disconnected from the line circuit and other terminals normally connected with the line circuit, and means whereby the connection of said cord-connecting apparatus with said line causes the connection of said test terminals with the line circuit, substantially as described.

25. In a multiple switchboard telephone exchange system, the combination with subscribers' telephone lines extending from subscribers' stations to the exchange and each there permanently connected with a contact of the several line jacks upon the different sections of the multiple board, a battery at the exchange for supplying talking current to the substation, one limb of each line extending to test contact portions of the jacks, a switch at the exchange being included in this limb of the line for opening and closing the same, an electromagnet for operating the switch, cord connecting apparatus serving to energize the magnet to operate the switch, and testing means, substantially as described.

26. In a multiple switchboard telephone exchange system, the combination with subscribers' telephone lines extending from subscribers' stations to the exchange and each there normally connected with a contact of the several line jacks upon the different sections of the multiple board, a battery at the exchange for supplying talking current to the substation, one limb of each line extending to test contact portions of the jacks, a switch at the exchange being included in this limb of the line for opening and closing the same, an electromagnet for operating the switch, cord-connecting apparatus serving to energize the magnet to operate the switch, and a local test circuit including a talking cord strand and the portion of the limb of the telephone line extending to the test contact portions of jacks, substantially as described.

27. In a telephone exchange system, the combination with a line indicator and a cut-off relay included in series in a telephone line circuit, and means whereby the cut-off relay may be actuated to render the line indicator insensitive to control by a switch in the line circuit.

28. In a multiple switchboard telephone exchange system, the combination with subscribers' telephone lines extending from subscribers' stations to the exchange and each there connected with the several jacks upon the different sections of the multiple board, one limb of each line extending to test contact portions of the jacks, a switch at the exchange being included in this limb of the line for opening and closing the same, a differential electro-magnetic device for operating the switch, cord connecting apparatus serving to energize the magnet in such a way as to operate the switch, and an operator's testing circuit, substantially as described.

29. In a telephone exchange system, telephone lines each extending by its limbs from a substation to an exchange, line signals in such line circuits, a source of electric energy at such exchange adapted to supply talking and signaling current to such lines, line jacks for terminating such lines at such exchange, test contacts associated with such jacks normally disconnected from such line limbs and relays serially included in such line circuits for disconnecting such line signals and connecting such contacts to the corresponding line limbs.

30. In a telephone exchange system, a telephone line extending by its limbs from a substation to an exchange and there adapted to terminate in a pair of jack contacts, one of such contacts being normally disconnected from the line limbs, a line signal associated with such line circuit, a source of electric energy at such exchange adapted to supply talking and signaling current to such line and means in such line circuit for connecting the normally disconnected talking contact to the corresponding line limb.

31. In a telephone exchange system, telephone lines each extending by its limbs from a substation to an exchange, line signals in such line circuits, a source of electric energy at such exchange adapted to supply talking and signaling current to such lines, line jacks for terminating such lines at such exchange, talking contacts associated with such jacks normally disconnected from such line limbs and relays normally connected with such line limbs and adapted when actuated to disconnect such line signals and connect such contacts to the corresponding line limbs.

32. In a telephone exchange system, the combination of a telephone line extending by its limbs from a substation to an exchange, a spring jack at the exchange having main talking contacts adapted for connection with such line limbs, one of such contacts being normally disconnected therefrom, cord connecting apparatus for connecting said line with another for conversation and a differentially wound electromagnet normally included in circuit with such line limbs and adapted to be actuated to connect the normally disconnected jack contact with one of such line limbs upon the connection of the cord circuit with such spring jack.

33. In a telephone exchange system, the combination of a telephone line extending by its limbs from a substation to an exchange, a spring jack at the exchange having main talking contacts adapted for connection with such line limbs, one of such contacts being normally disconnected therefrom, cord connecting apparatus for connecting said line with another for conversation and an electromagnetic device having two windings, one of such windings being normally connected in circuit with the line limbs, and the other winding adapted to be energized by current flowing over the cord connecting apparatus upon the connection of such apparatus with the spring jack of the line to cause the electromagnetic device to be actuated to connect the normally disconnected jack contact with one of such line limbs.

34. In a telephone exchange system, the combination of a telephone line extending by its limbs from a substation to an exchange, a spring jack at the exchange having main talking contacts adapted for connection with such line limbs, one of such contacts being normally disconnected therefrom, a line signal at such exchange normally under the control of the substation, cord connecting apparatus for connecting such line with another for conversation and an electromagnetic device having two windings, one of such windings being normally connected in circuit with the line limbs and the other winding adapted to be energized by current flowing over the cord connecting apparatus upon the connection of such apparatus with the spring jack of the line to destroy the substation control of such line signal.

35. In a telephone exchange system, the combination of a telephone line extending by its limbs from a substation to an exchange, a spring jack at the exchange having main talking contacts adapted for connection with such line limbs, cord connecting apparatus for connecting said line with another for conversation and an electromagnetic device having two windings, one of said windings being normally connected with a line limb and the other winding adapted to be energized by current flowing over the cord connecting apparatus upon the connection of such apparatus with the spring jack of the line to alter the line connections.

36. In combination, a source of current and a line indicator in circuit with a telephone line, and a cut-off relay so connected to such circuit as to be insensitive to current caused to flow from said source through the winding of said relay by a switch in the telephone line.

37. In combination, a source of current and a line indicator in circuit with a telephone line, a cut-off relay adapted to remove said indicator from said circuit, and a switch in the telephone line for closing a circuit from said source through the winding of said relay without operating said relay.

In witness whereof I hereunto subscribe my name this 26th day of May, 1903.

HARRY G. WEBSTER.

Witnesses:
LYNN A. WILLIAMS,
HARVEY L. HANSON.

Copies of this patent may be obtained for five cents each, by addressing the "Commissioner of Patents, Washington, D. C."